United States Patent Office 3,733,336
Patented May 15, 1973

3,733,336
PROCESS FOR THE PRODUCTION OF 5,6-DIHYDRO-2H-THIOPYRAN-3-CARBOXALDEHYDE
Hans Wagner and Klaus W. Udluft, Konstanz, Germany, assignors to Deutsche Gold- und Silber-Scheideanstalt vormals Roessler, Frankfurt am Main, Germany
No Drawing. Filed Apr. 6, 1970, Ser. No. 26,160
Claims priority, application Germany, Apr. 17, 1969,
P 19 19 504.1
Int. Cl. C07d 65/08
U.S. Cl. 260—327 TH                13 Claims

ABSTRACT OF THE DISCLOSURE 5,6-dihydro-2H-thiopyran-3-carboxaldehyde is produced by reacting acrolein with hydrogen sulfide in the presence of a small amount of a basic or acidic catalyst followed by treating the reaction product with a large amount of an acid.

---

The invention is directed to a process for the production of 5,6-dihydro-2H-thiopyran-3-carboxaldehyde by reaction of acrolein with hydrogen sulfide. 5,6-dihydro-2H-thiopyran-3-carboxaldehyde is a valuable intermediate for the production of vitamins, e.g., nicotinic acid and derivatives, for example nicotine amide, medicines and pesticides.

It is known to produce 5,6-dihydro-2H-thiopyran-3-carboxaldehyde by the reaction of 3-chloropropionaldehyde diethyl acetal with potassium sulfide (J. Chem. Soc., 1941, pages 404–408). This process is cumbersome and expensive because of the necessarily long reaction time and besides results in yields of less than 60%. Since, on the other hand, 3-chloropropionaldehyde diethyl acetal is produced from acrolein, ethanol and hydrogen chloride only in a yield of about 80%, the overall yield amounts at the highest to only 50%.

There has now been found a process for the production of 5,6 - dihydro - 2H - thiopyran-3-carboxaldehyde, which is characterized in that acrolein is reacted with hydrogen sulfide in the presence of basic or acidic materials and the reaction product treated with acid. According to this process, it is possible to produce 5,6-dihydro-2H-thiopyran-3-carboxaldehyde at relatively short reaction times from simple starting materials in yields of about 90%.

According to the invention, acrolein and hydrogen sulfide are interreacted preferably at temperatures between $-10$ and $+150°$ C., especially $+20$ to $+80°$ C. The reaction can be carried out under normal or elevated pressures. For example, a pressure range between 1 and 11 atmospheres absolute (gauge) is suitable.

The proportions of acrolein to hydrogen sulfide can range between wide boundaries, e.g., from 5 to 1 mols to 1.5 to 1 mols. Especially advantageous is a molar proportion of 2:1.

The reaction of acrolein with hydrogen sulfide takes place in the presence of basic or acidic materials as catalysts, which in general are added in an amount of 0.001 to 0.05 mol per mol of acrolein, although up to 0.1 mol can be used per mol of acrolein. As basic materials (proton acceptors), these are preferably used secondary or tertiary amines such as piperidine, trimethyl amine, triethyl amine, pyridine, diethyl amine, dimethyl aniline, morpholine, dibutyl amine, tributyl amine, quinoline. There can also be used, however, other basic materials such as primary amines, e.g. aniline, methylamine, inorganic basic materials, e.g. NaOH, KOH, $Na_2Co_3$, $K_2Co_3$, NaKS, $Na_2S$, $K_2S$, $NH_3$ or basic ion exchange resins. As acids these are preferably used: phosphoric acid (proton donors), acetic acid or sulfuric acid. However, there can be used other acids such as propionic acid, formic acid, p-toluene sulfonic acid, benzene sulfonic acid, chloroacetic acid, maleic acid, hydrochloric acid, acidic ion exchange resins. The catalyst should be essentially inert to the reactants under the reaction conditions.

The hydrogen sulfide can be reacted directly with the acrolein, especially in the case of the use of acidic catalysts. However, preferably the reaction is carried out in organic solvents. As solvents there can be used organic compounds or their mixtures which preferably are liquid at room temperature and inert to the reactants. As examples, there can be used haloalkanes or haloalkenes such as chloroform, carbon tetrachloride, n-propyl chloride, ethyl bromide, hexyl chloride, trichloroethylene, dichloroethylene, ethylene dichloride, ethylene dibromide, bromo-form or tetrachloroethane, aromatic hydrocarbons such as benzene, toluene, xylene, ethyl benzene, mesitylene, cumene and 1,3,5-triethylbenzene, alcohols with 1 to 4 carbon atoms such as methanol, ethanol, isopropanol and butanol, also ethers such as dioxane, tetrahydrofuran, diethyl ether, dipropyl ether, methyl n-butyl ether, diamyl ether.

The reaction partners are preferably added in anhydrous condition. Small amounts of water, however, are not troublesome. The amount of water in the reaction mixture, however, should not generally exceed 5%.

The treatment of the reaction product with acid in the second step takes place at temperatures of from 60 to 160° C., preferably 90 to 130° C., at normal, or in a given case, elevated pressure up to 11 atmospheres absolute.

As acids there are especially suited strong acids. Preferred are mineral acids such as phosphoric acid, sulfuric acid or hydrochloric acid or organic acids such as benzene sulfonic acid, p-toluene sulfonic acid, trichloroacetic acid and the like, which can be used undiluted or as aqueous or alcoholic solution. The amount of acid employed can be from 0.5 to 10 equivalents as acid per mol of acrolein employed originally. The acids can be added repeatedly. Thereby, a somewhat increased yield can be attained.

The process of the invention will be illustrated by the following examples.

Unless otherwise indicated, all parts and percentages are by weight.

EXAMPLE 1

An autoclave equipped with a stirrer was charged with 350 parts of chloroform and 1 part of triethyl amine. 90 parts of hydrogen sulfide were forced in so that a pressure of 7.5 atmospheres absolute (gauge) resulted. Within 30 minutes a uniform stream of 300 parts of 97% acrolein was added with stirring and cooling. The temperature of the mixture rose thereby from 20 to 60° C.

After the supplying of 200 parts of acrolein the pressure became noticeably reduced; after the addition of 270 parts of acrolein the reaction was no longer exothermic. The reaction mixture was stirred for another 30 minutes after the end of the addition of the acrolein. Then a solution of 300 parts of 85% aqueous phosphoric acid in 500 parts of water were added. The mixture was heated with stirring for two hours at 130° C. and finally cooled. The chloroform phase which contained the main portion of the 5,6-dihydro-2H-thiopyran-3-carboxaldehyde was separated from the aqueous phase. The aqueous phase was then extracted twice with (each time) 50 parts of chloroform and these extracts added to the chloroform phase. This was subsequently dried with sodium sulfate and distilled. There was 304 parts of 5,6-dihydro-2H-thiopyran-3-carboxaldehyde, corresponding to a yield of 91.4%, B.P.$_{0.2}$ 72–75° C.; $n_D^{20}$ 1.5672; M.P. 31° C.;

oxime M.P. 116° C.; semicarbazone M.P. 228° C.; 2,4-dinitrophenylhydrazone M.P. 246° C.

EXAMPLE 2

In an autoclave equipped with a stirrer charged with 500 parts of methanol containing 1 part of pyridine there were forced in 180 parts of hydrogen sulfide. Within 30 minutes with stirring and cooling there were added 600 parts of 97% acrolein. The pressure, which initially amounted to 7.5 atmospheres absolute, sank to zero, the temperature rose to 50 to 60° C. It was stirred further for 30 minutes. Then there were added 800 parts of 11 N phosphoric acid and the mixture held at 100° C. for 3 hours.

Upon cooling, the 5,6-dihydro-2H-thiopyran-3-carboxaldehyde separated as an oily phase. This was dried with sodium sulfate and distilled.

There were obtained 575 parts of 5,6-dihydro-2H-thiopyran-3-carboxaldehyde, corresponding to a yield of 86.4%, $B.P._{0.1}$ 67–70° C.

EXAMPLE 3

The process was carried out as in Example 1. However, the acid treatment was carried out by heating for two hours at 90° C. with 500 parts of 3 N sulfuric acid. The heating occurred at normal pressure; the chloroform was thereby distilled off. Upon cooling, the 5,6-dihydro-2H-thiopyran-3-carboxaldehyde separated from the aqueous solution. It was dried and distilled.

There were obtained 296 parts of 5,6-dihydro-2H-thiopyran-3-carboxaldehyde, corresponding to a yield of 88.9%., $B.P._{0.2}$ 73–76° C.

EXAMPLE 4

In an autoclave equipped with a stirrer there were added 600 parts of acrolein and 1 part of 85% aqueous phosphoric acid at room temperature. To this mixture there were forced in 180 parts of hydrogen sulfide. Within 10 minutes the temperature rose to 60° C. The pressure which had reached 6.5 atmospheres absolute during the forcing in of the hydrogen sulfide sank to zero. There was then added a solution of 650 parts of 85% aqueous phosphoric acid in 1200 parts of water and the mixture heated for two hours at 100° C. By subsequent cooling, the 5,6-dihydro-2H-thiopyran-3-carboxaldehyde separated as a special phase. The aqueous phase was extracted with 100 parts of chloroform and the extract added to the aldehyde phase. This was then distilled.

There were obtained 522 parts of 5,6-dihydro-2H-thiopyran-3-carboxaldehyde, corresponding to a yield of 76.0%, $B.P._{0.5}$ 90–93° C.

What is claimed is:

1. A process for the production of 5,6-dihydro-2H-thiopyran-3-carboxaldehyde comprising reacting acrolein with hydrogen sulfide in the presence of 0.001 to 0.1 mol per mol of acrolein of a proton acceptor basic catalyst or a proton donor acid catalyst and then treating the reaction product with 0.5 to 10 equivalents of acid per mol of acrolein employed.

2. A process according to claim 1 wherein the catalyst is used in an amount of 0.001 to 0.05 mol per mol of acrolein.

3. A process according to claim 1 wherein the reaction is carried out in the presence of an inert organic solvent.

4. A process according to claim 3 wherein the solvent is a halohydrocarbon or an alkanol.

5. A process according to claim 1 wherein the catalyst is a tertiary amine.

6. A process according to claim 1 wherein the catalyst is phosphoric acid.

7. A process according to claim 1 wherein the reaction of acrolein with hydrogen sulfide is caried out at —10 to +150° C.

8. A process according to claim 7 wherein the reaction of acrolein with hydrogen sulfide is carried out at a pressure from normal to 10 atmospheres in excess of normal.

9. A process according to claim 1 wherein the acid used to treat the reaction product is a strong acid.

10. A process according to claim 9 wherein the acid treatment is at 60 to 160° C.

11. A process according to claim 10 wherein the acid treatment is at 90 to 130° C., the catalyst is used in an amount of 0.001 to 0.05 mol per mol of acrolein and the reaction of acrolein with hydrogen sulfide is carried out at 20 to 80° C. at a pressure of from normal to 10 atmospheres above normal.

12. A process according to claim 11 wherein the molar ratio of acrolein to hydrogen sulfide is 2:1.

13. A process according to claim 1 wherein the acid is selected from the group consisting of phosphoric acid, sulfuric acid, hydrochloric acid, benzene sulfonic acid, p-toluene sulfonic acid and trichloroacetic acid.

References Cited

Asinger et al., J. Prakt. Chem. 35 (1–2), pp. 81–9 (1967).

Morrison et al., Organic Chemistry (Allyn and Bacon, Boston, 1965), pp. 636 to 638.

HENRY R. JILES, Primary Examiner

C. M. S. JAISLE, Assistant Examiner